(12) United States Patent
Tategata et al.

(10) Patent No.: US 10,998,789 B2
(45) Date of Patent: May 4, 2021

(54) BUSBAR UNIT FOR A STATOR OF AN ELECTRIC MOTOR

(71) Applicant: Nidec Corporation, Kyoto (JP)

(72) Inventors: Kazunori Tategata, Kyoto (JP); Juergen Schmid, Bietigheim-Bissingen (DE)

(73) Assignee: NIDEC CORPORATION, Kyoto (JP)

( * ) Notice: Subject to any disclaimer, the term of this patent is extended or adjusted under 35 U.S.C. 154(b) by 78 days.

(21) Appl. No.: 16/461,132

(22) PCT Filed: Dec. 5, 2017

(86) PCT No.: PCT/JP2017/043602
§ 371 (c)(1),
(2) Date: May 15, 2019

(87) PCT Pub. No.: WO2018/105595
PCT Pub. Date: Jun. 14, 2018

(65) Prior Publication Data
US 2020/0106319 A1    Apr. 2, 2020

(30) Foreign Application Priority Data

Dec. 5, 2016  (DE) .......................... 102016123479.6

(51) Int. Cl.
*H02K 3/28* (2006.01)
*H02K 3/38* (2006.01)
*H02K 3/50* (2006.01)

(52) U.S. Cl.
CPC ................. *H02K 3/28* (2013.01); *H02K 3/38* (2013.01); *H02K 3/505* (2013.01); *H02K 2203/09* (2013.01)

(58) Field of Classification Search
CPC ............. H02K 3/28; H02K 3/12; H02K 3/505
(Continued)

(56) References Cited

U.S. PATENT DOCUMENTS

| 2003/0173841 A1 | 9/2003 | Kobayashi et al. |
| 2003/0173842 A1 | 9/2003 | Kobayashi et al. |

(Continued)

FOREIGN PATENT DOCUMENTS

| CN | 1414672 A   | 4/2003  |
| CN | 102782996 A | 11/2012 |

(Continued)

OTHER PUBLICATIONS

Official Communication issued in International Patent Application No. PCT/JP2017/043602, dated Feb. 13, 2018.

*Primary Examiner* — Terrance L Kenerly
(74) *Attorney, Agent, or Firm* — Keating & Bennett (57) ABSTRACT

A busbar unit for a stator of an electric motor may include a busbar holder at least a portion of which is made of an electrically insulating material and is to be positioned on an axial side of a stator, the busbar holder including a stator surface that is intended to face an axial side of a stator when the busbar holder is positioned on the axial side of the stator as intended, and at least one busbar mounted on the busbar holder. The at least one busbar may include a power source connection terminal to be electrically connected to a power source, and at least one coil connection terminal to be electrically connected to a coil of the stator and protruding beyond the stator surface of the busbar holder.

11 Claims, 7 Drawing Sheets

(58) Field of Classification Search
USPC .......................................................... 310/71
See application file for complete search history.

(56) References Cited

U.S. PATENT DOCUMENTS

| | | |
|---|---|---|
| 2010/0187923 A1 | 7/2010 | Migita et al. |
| 2011/0175471 A1 | 7/2011 | Marchitto et al. |
| 2012/0286593 A1* | 11/2012 | Yokogawa ............ H02K 3/522 |
| | | 310/43 |
| 2012/0319512 A1 | 12/2012 | Nakagawa |
| 2016/0013691 A1 | 1/2016 | Houzumi et al. |
| 2016/0028286 A1 | 1/2016 | Houzumi et al. |
| 2016/0036187 A1 | 2/2016 | Houzumi et al. |

FOREIGN PATENT DOCUMENTS

| | | |
|---|---|---|
| CN | 105009427 A | 10/2015 |
| JP | 2008-278703 A | 11/2008 |
| JP | 2008-278708 A | 11/2008 |

* cited by examiner

BUSBAR UNIT FOR A STATOR OF AN ELECTRIC MOTOR

CROSS REFERENCE TO RELATED APPLICATIONS

This is the U.S. national stage of application No. PCT/JP2017/043602, filed on Dec. 5, 2017, and priority under 35 U.S.C. § 119(a) and 35 U.S.C. § 365(b) is claimed from German Application No. 102016123479.6, filed Dec. 5, 2016, the entire contents of which are incorporated herein by reference.

1. Field of the Invention

Various example embodiments relate generally to a busbar unit for a stator of an electric motor and to an electric motor including a busbar unit.

2. Background

Electric motors have become essential parts in a large variety of driving systems employed in mobile environments such as in vehicles. A key parameter of a driving system of this kind that is subject to permanent optimization is the volume thereof. The volumes of electric motors are determined inter alia by the detailed configuration of a busbar unit that is utilized for electrically connecting the coils of a stator of the electric motor to a power source and/or to a controller.

SUMMARY

In view of the above, example embodiments of the present disclosure provide busbar units for stators of electric motors each having a compact structure.

According to various example embodiments, a busbar unit for a stator of an electric motor is provided. The busbar unit may include a busbar holder at least a portion of which is made of an electrically insulating material and is to be positioned on an axial side of a stator, the busbar holder including a stator surface that is intended to face an axial side of a stator when the busbar holder is positioned on the axial side of the stator as intended, and at least one busbar mounted on the busbar holder. The at least one busbar may include a power source connection terminal to be electrically connected to a power source, and at least one coil connection terminal to be electrically connected to a coil of the stator and protruding beyond the stator surface of the busbar holder.

The above and other elements, features, steps, characteristics and advantages of the present disclosure will become more apparent from the following detailed description of the example embodiments with reference to the attached drawings.

DETAILED DESCRIPTION

The following detailed description refers to the accompanying drawings that show, by way of illustration, specific details and example embodiments in which the disclosure may be practiced.

The word "exemplary" is used herein to mean "serving as an example, instance, or illustration". Any example embodiment or design described herein as "exemplary" is not necessarily to be construed as preferred or advantageous over other example embodiments or designs.

Figure 1:
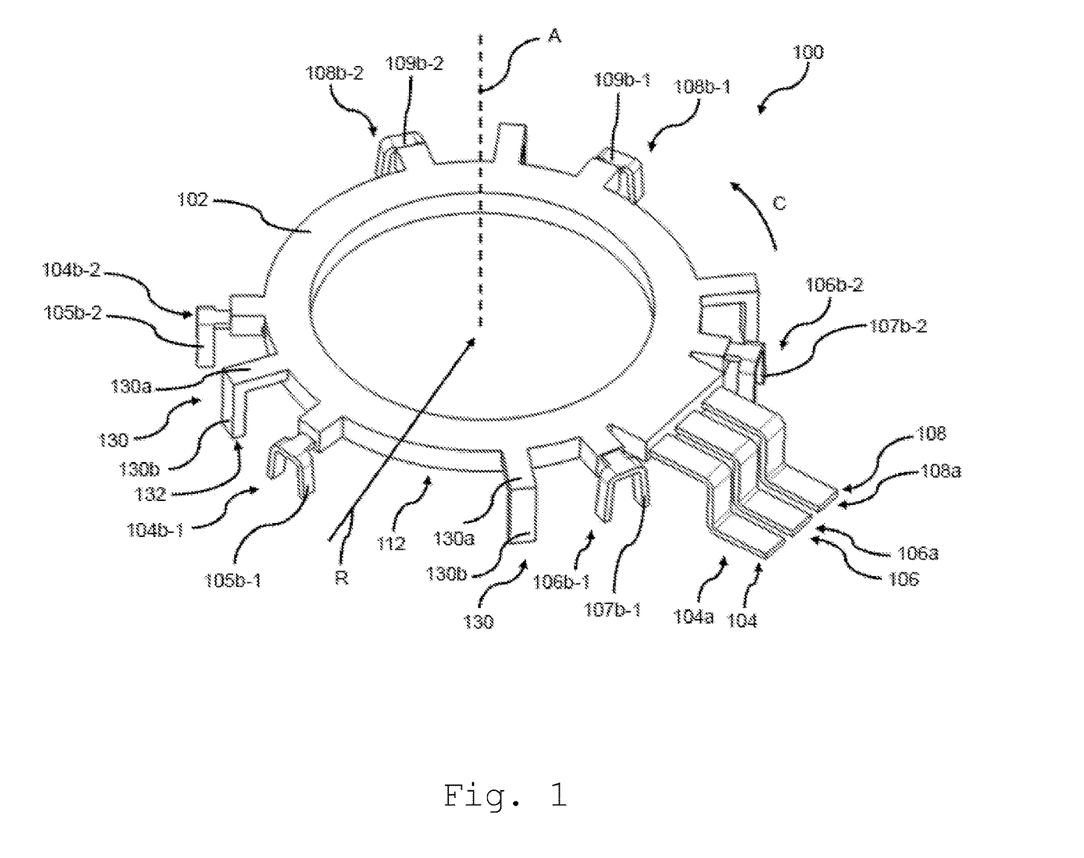
FIG. 1 shows a perspective view of a busbar unit according to a first example embodiment of the present disclosure.

FIG. 1 shows a busbar unit 100 for a stator of an electric motor. The busbar unit 100 may include a busbar holder 102 and a plurality of busbars 104, 106, 108 mounted on the busbar holder 102. The busbars 104, 106, 108 may be made of an electrically conductive material such as of a metal, e.g., of copper. The busbar holder 102 may be made at least in part or entirely of an electrically insulating material. The electrical conductivity of the insulating material of the busbar holder 102 may be less than 10−8 S/m. By means of such an electrically insulating material short circuits between the busbars 104, 106, 108 can be effectively avoided.

The busbar holder 102 may be formed by injection molding and may be molded over a part of the busbars 104, 106, 108. In this way, a tight and highly defined physical connection between the busbar holder 102 and the busbars 104, 106, 108 may be provided.

Figure 3:
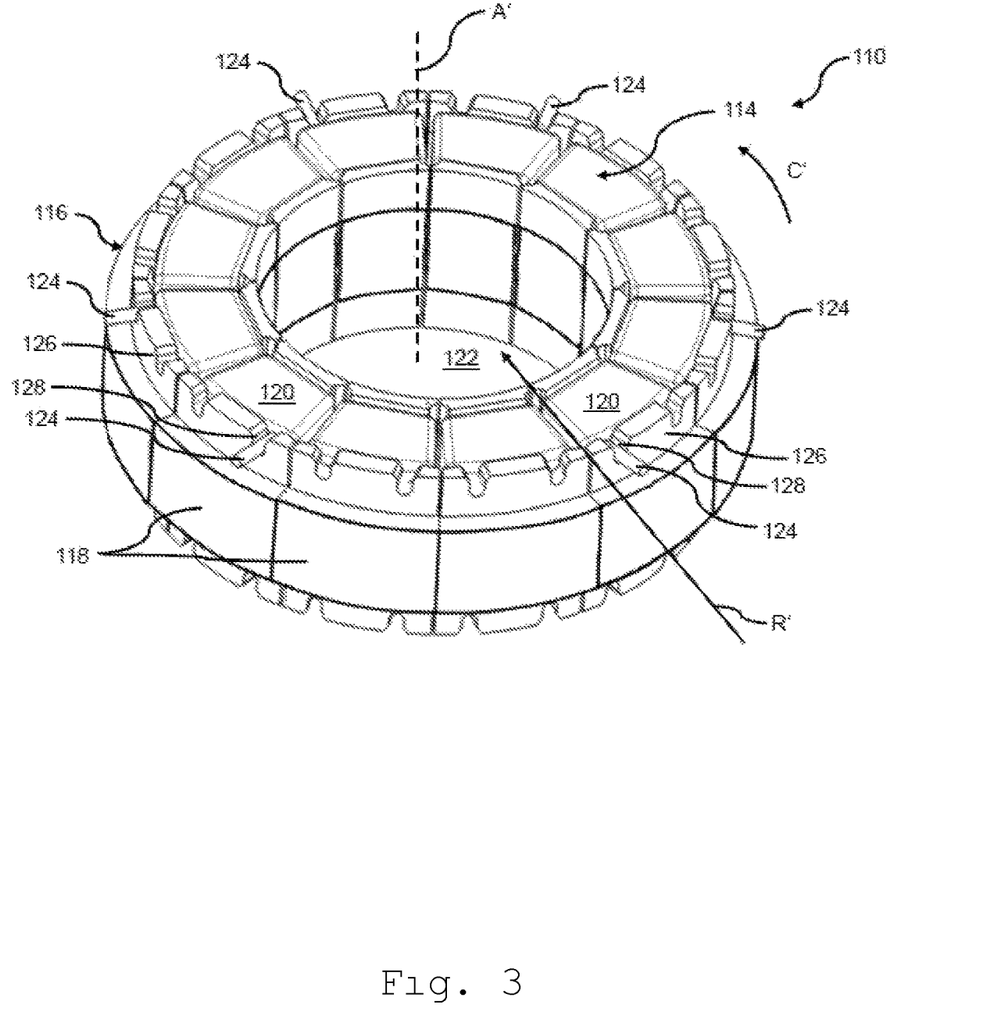
FIG. 3 shows a perspective view of a stator.
Figure 4:
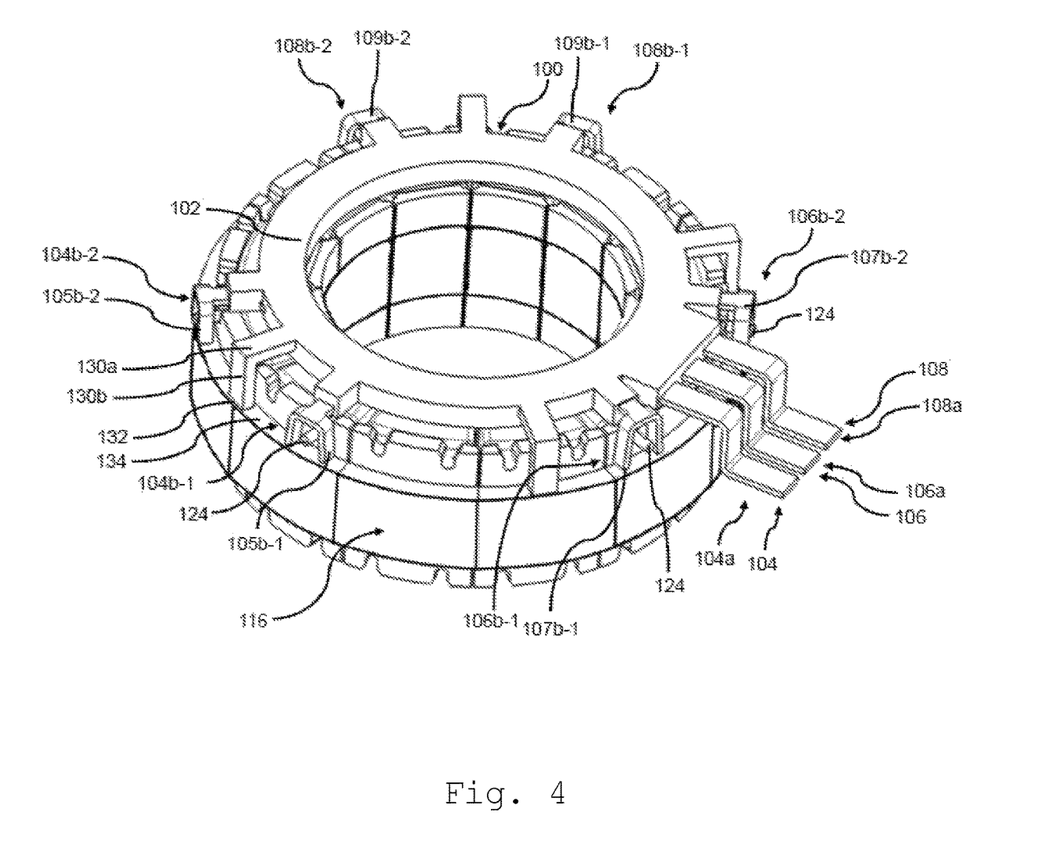
FIG. 4 shows a perspective view of the busbar unit of FIG. 1 mounted on an axial end side of the stator shown in FIG. 3.

The busbar holder 102 may be configured to be positioned on an axial side of a stator 110 shown in FIGS. 3 and 4. In FIG. 3, the stator 110 alone, i.e. without the busbar unit 100 is shown, and in FIG. 4 the stator 110 with the busbar unit 100 mounting thereon is depicted.

The busbar holder 102 may have a stator surface 112 that is intended to face an axial side 114 of the stator 110 when the busbar unit 100 is positioned on the axial side 114 of the stator 110 as intended. In FIGS. 1 and 4, the stator surface 112 of the busbar holder 102 is the lower surface thereof and is not visible in these figures.

In the example embodiment shown in FIG. 1, the busbar holder 102 has a substantially annular shape centered around a central axis A and continuously extending in a circumferential direction C.

As shown in FIG. 3, the stator 110 may also be provided with an annular shape centered around a respective central axis A' and continuously extending in a circumferential direction C'. When mounted on the axial end side 114 of the stator 110, the central axis A of the busbar holder 102 may be substantially parallel to the central axis A' of the stator 110.

The stator 110 may include a stator core 116 including a plurality of stator core segments 118 around which respective coils 120 are wound. In FIGS. 3 and 4, the coils 120 are only schematically shown. The stator core segments 118 are consecutively arranged in the circumferential direction C' of the stator 110. The stator core segments 118 may be made at least in part of a ferromagnetic material such as of ferromagnetic steel.

The stator 110 may be fixedly mounted inside of the housing of an electric motor and may be configured to generate a time-varying magnetic field by means of the coils 120. A magnetized rotor (not shown in the figures) may be mounted in the central opening 122 of the stator 110 and may be configured to be rotated by an interaction with the time-varying magnetic field generated by the coils 120.

Figure 2:
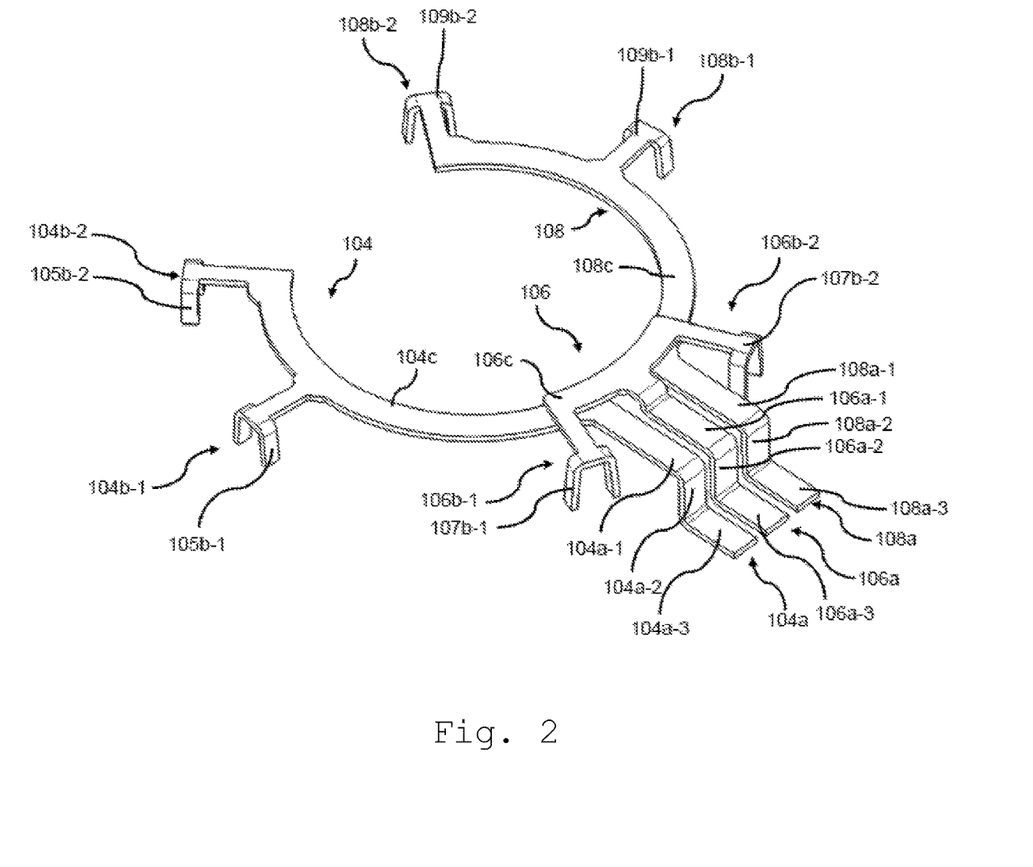
FIG. 2 shows a perspective view of a plurality of busbars of the busbar unit shown in FIG. 1.

The busbar unit 100 is configured to electrically contact the coils 120 of the stator 110 by means of the busbars 104, 106, 108. The detailed configuration of the busbars 104, 106, 108 is shown in FIG. 2. In this figure, the busbar holder 102 is omitted.

As shown in FIG. 2, each of the busbars 104, 106, 108 may include a power source connection terminal member 104a, 106a, 108a configured to be electrically connected to a power source, and at least one coil connection terminal member configured to be electrically connected to a coil 120 of the stator 110 and protruding beyond the stator surface 112 of the busbar holder 102. In the example embodiment shown in the figures, each busbar 104, 106, 108 includes two coil connection terminal members 104b-1, 104b-2, 106b-1, 106b-2, 108b-1, 108b-2. The number of the coil connection terminal members is, however, not restricted to two, but may be varied according to the detailed configuration of the coils 120 of the stator 110.

The coils 120 may be grouped into a plurality of phase groups respectively including a plurality of coils 120 electrically connected to each other in series. In the example embodiment shown in the figures, the coils 120 may be grouped into three phase groups U, V, W. The coils 120 of the respective phase groups U, V, W may be formed by a winding wire wound around respective stator core segments 118 of the stator core 116 and may be connected to a power source by means of end portions 124 of the winding wire connected to the respective coil connection terminal members 104b-1, 104b-2, 106b-1, 106b-2, 108b-1, 108b-2.

As mentioned above, the coil connection terminal members 104b-1, 104b-2, 106b-1, 106b-2, 108b-1, 108b-2 protrude beyond the stator surface 112 of the busbar holder 102, i.e. in the mounted state shown in FIG. 4 towards the stator 110. In this way, the axial extension of the stator 110 is not substantially increased by the busbar unit 100. Consequently, a stator equipped with a busbar unit according to the present disclosure may be provided that has a small axial extension. In this way, also an electric motor equipped with such a stator may be provided that has a small axial extension.

As indicated in the figures, the end portions 124 of the winding wires may extend substantially only in the radial direction R' of the stator 110 and may be arranged consecutively in the circumferential direction C' of the stator 110 at angular intervals corresponding to the angular positions of the respective coil connection terminal members 104b-1, 104b-2, 106b-1, 106b-2, 108b-1, 108b-2.

As indicated in FIGS. 3 and 4, the core segments 118 may respectively include positioning means 126 for the winding wire end portions 124 at a radially outer side of the stator 110. The positioning means 126 may be made of an electrically insulating material to avoid short circuits between winding wires of different phases and may include recesses 128 at an axial end thereof configured to receive the winding wire end portions 124 therein. By means of the positioning means 126, the winding wire end portions 124 may be positioned at defined positions in the circumferential direction C' of the stator 110. In this way, a defined electrical connection between the winding wire end portions 124 and the respective coil connection terminal members 104b-1, 104b-2, 106b-1, 106b-2, 108b-1, 108b-2 may be established.

At least one or even all coil connection terminal members 104b-1, 104b-2, 106b-1, 106b-2, 108b-1, 108b-2 may include or may be configured as crimp members 105b-1, 105b-2, 107b-1, 107b-2, 109b-1, 109b-2 configured to be crimped around the winding wire end portions 124. In this way, the winding wire end portions 124 may be electrically connected to the busbars 104, 106, 108 simply by mechanically deforming the respective coil connection terminal members 104b-1, 104b-2, 106b-1, 106b-2, 108b-1, 108b-2, meaning that no additional connection means are required for the connection thereof to the coil connection terminal members 104b-1, 104b-2, 106b-1, 106b-2, 108b-1, 108b-2. In this way, a simple overall setup may be provided.

The crimp members 105b-1, 105b-2, 107b-1, 107b-2, 109b-1, 109b-2 may have a substantially U-shaped or V-shaped form that is open at a leading end in the protrusion direction, i.e. in the axial direction A of the busbar unit 100. By means of this configuration, the crimp members 105b-1, 105b-2, 107b-1, 107b-2, 109b-1, 109b-2 in their initial undeformed state prior to crimping them around the winding wire end portions 124 may be positioned relative to the respective winding wire end portions 124 such as to partly surround them. Subsequently, the crimp members may be crimped around the respective winding wire end portions 124 by a crimping tool positioned above the busbar unit 100, i.e. on a side of the busbar unit 100 opposite to the axial end side 114 of the stator 110 on which the busbar unit 100 is mounted. In this way, the crimping may be performed by an automated process employing, e.g., a crimping robot that has unrestricted access to the crimp members 105b-1, 105b-2, 107b-1, 107b-2, 109b-1, 109b-2.

As shown in the figures, the power source connection terminal members 104a, 106a, 108a may also protrude beyond the stator surface 112 of the busbar holder 102. In this way, the axial extension of the stator 110 is not substantially increased by the power source connection terminal members 104a, 106a, 108a. Consequently, a stator equipped with a busbar unit may be provided that has a small axial extension. In this way, also an electric motor equipped with such a stator may be provided that has a small axial extension.

As indicated in FIGS. 1 and 2, each busbar 104, 106, 108 may further include a base portion 104c, 106c, 108c extending along the busbar holder 102 and connecting the coil connection terminal members 104b-1, 104b-2, 106b-1, 106b-2, 108b-1, 108b-2 to the respective power source connection terminal members 104a, 106a, 108a. The base portions 104c, 106c, 108c of the respective busbars 104, 106, 108 may have an annular segment shape corresponding to portions of the annular shape of the busbar holder 102. In this way, the base portions 104c, 106c, 108c of the respective busbars 104, 106, 108 may be fully embedded into the respective busbar holder 102 and may be, hence, electrically isolated from the exterior of the busbar unit 100. Consequently, a busbar unit 100 with a compact structure may be provided in this way, since no additional isolation means for the base portions 104c, 106c, 108c are required.

The busbars 104, 106, 108 may be positioned in an overlapping configuration in the axial direction A of the busbar unit 110 as indicated in FIG. 2. The overlapping portions of the busbars 104, 106, 108 may be electrically isolated from each other, e.g., by an intermediate layer that may be part of the busbar holder 102. In a modified example embodiment, the busbar holder 102 may include a plurality of busbar holder layers stacked in the axial direction A of the busbar unit and respectively carrying at least a busbar.

The power source connection terminal members 104a, 106a, 108a may be provided with a stepped configuration respectively including a first portion 104a-1, 106a-1, 108a-1 extending from the respective base portion 104c, 106c, 108c substantially in the radial direction R of the busbar holder 102, a second portion 104a-2, 106a-2, 108a-2 connected to the respective first portion 104a-1, 106a-1, 108a-1 and extending in the axial direction A of the busbar holder 102, and a third portion 104a-3, 106a-3, 108a-3 connected to the second portion 104a-2, 106a-2, 108a-2 and extending in the radial direction R of the busbar holder 102.

As shown in FIG. 2, the first portions 104a-1, 106a-1, 108a-1 may have a larger radial extension than the coil connection terminal members 104b-1, 104b-2, 106b-1, 106b-2, 108b-1, 108b-2. In this way, the second portions 104a-2, 106a-2, 108a-2 and third portions 104a-3, 106a-3, 108a-3 of the power source connection terminal members 104a, 106a, 108a may be arranged radially outwardly of the stator 110, as shown in FIG. 4.

By means of this configuration, the outer circumferential surface of the stator core 116 facing the second portions 104a-2, 106a-2, 108a-2 of the power source connection terminal members 104a, 106a, 108a may serve as a stopper limiting a displacement of the power source connection terminal members 104a, 106a, 108a in a radially inward direction when applying a force thereto in the radially inward direction, e.g. during the coupling of the power source connection terminal members 104a, 106a, 108a to a power source. In this way, the mechanical stress exerted onto other parts of the busbar unit 100, in particular onto the coil connection terminal members 104b-1, 104b-2, 106b-1, 106b-2, 108b-1, 108b-2 crimped around the respective winding wire end portions 124 may be reduced, thereby inhibiting a deterioration of the electrical contact between the respective coil connection terminal members 104b-1, 104b-2, 106b-1, 106b-2, 108b-1, 108b-2 and the respective winding wire end portions 124.

The busbar unit 110 may further include a plurality of positioning members 130 protruding beyond the stator surface 112 of the busbar holder 102 by means of which the busbar holder 102 may be positioned on the axial end side 114 of the stator 110 such that the stator surface 112 of the busbar holder 102 is spaced apart from the axial end side 114 of the stator 110.

As shown in FIG. 1, the positioning members 130 may respectively include a first positioning member portion 130a extending radially outwardly from the busbar holder 102, and a second positioning member portion 130b extending from an end of the first positioning member portion 130a in the axial direction A of the busbar holder 102. As indicated in FIG. 4, an axial end 132 of the second positioning member portion 130b may be positioned on an outer radial portion 134 of the axial end side 114 of the stator 110. As shown in FIG. 4, the outer radial portion 134 may be positioned radially outwardly of the positioning means 126 for the winding wire end portions 124. In this way, the positioning means 126 may also serve as a positioning means for positioning the positioning members 130 in the radial direction of the stator 110.

As further shown in FIG. 4, the second and third portions 104a-2, 106a-2, 108a-2, 104a-3, 106a-3, 108a-3 of the power source connection terminal members 104a, 106a, 108a may be positioned radially outwardly of the positioning members 130. In this way, the coupling of the power source connection terminal members 104a, 106a, 108a to a power source can be performed without being obstructed by the positioning members 130.

The power source connection terminal members 104a, 106a, 108a may be directly connected to a power source or indirectly by means of an intermediately connected electronic control circuit configured to control the electric voltage and/or current supplied to the individual coils 120 to generate the time-varying magnetic field required for rotating a rotor.

As discussed above, the busbar unit 100 may be employed in an electric motor not shown in the figures. The electric motor may be configured as a hydraulic pump configured to convey a service liquid in a vehicle such as a coolant, e.g. cooling water, or lubricating oil.

Figure 5:
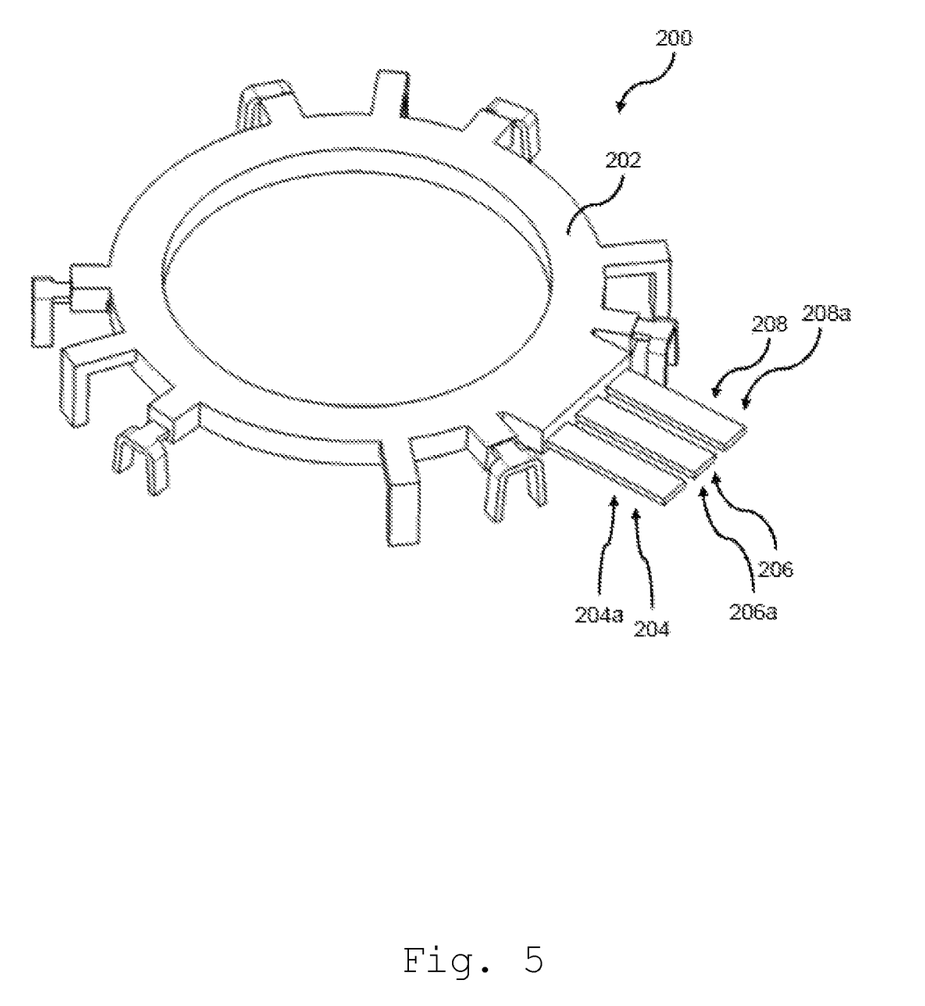
FIG. 5 shows a perspective view of a busbar unit according to a second example embodiment of the present disclosure.
Figure 6:
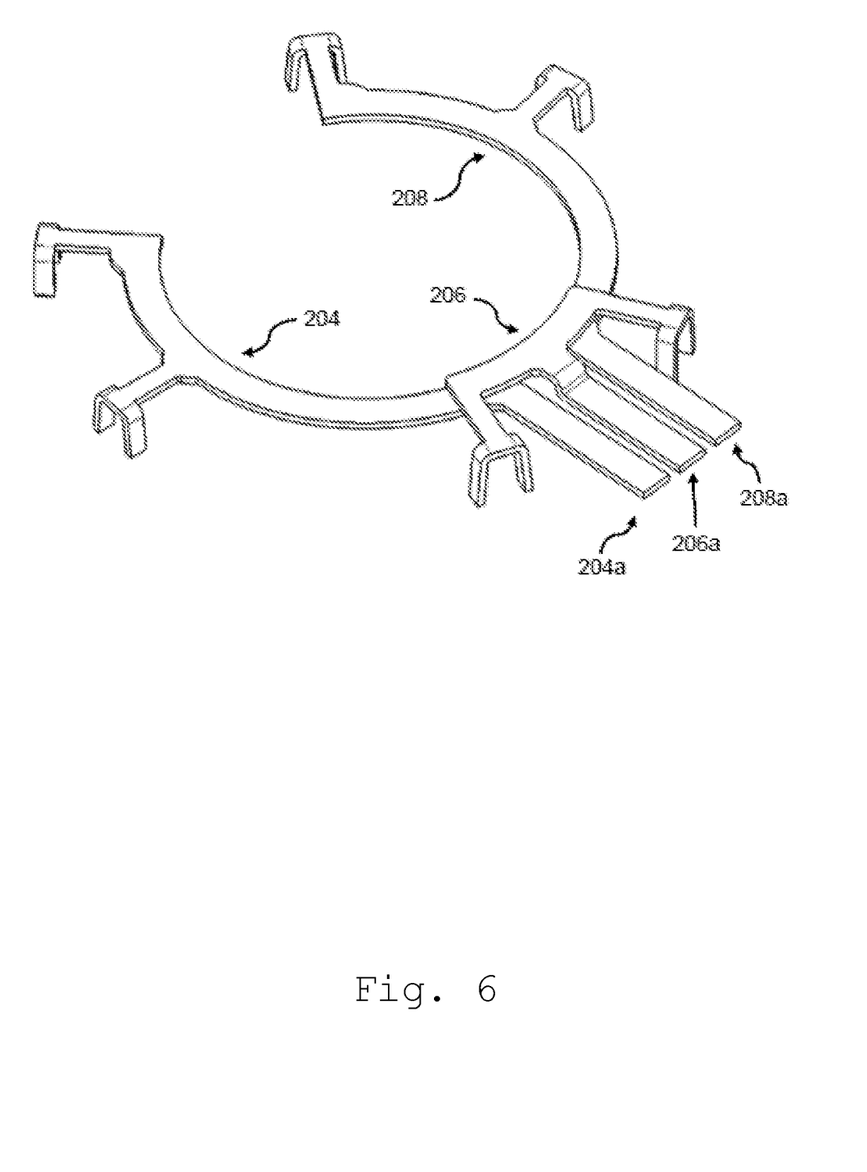
FIG. 6 shows a perspective view of a plurality of busbars of the busbar unit shown in FIG. 5.
Figure 7:
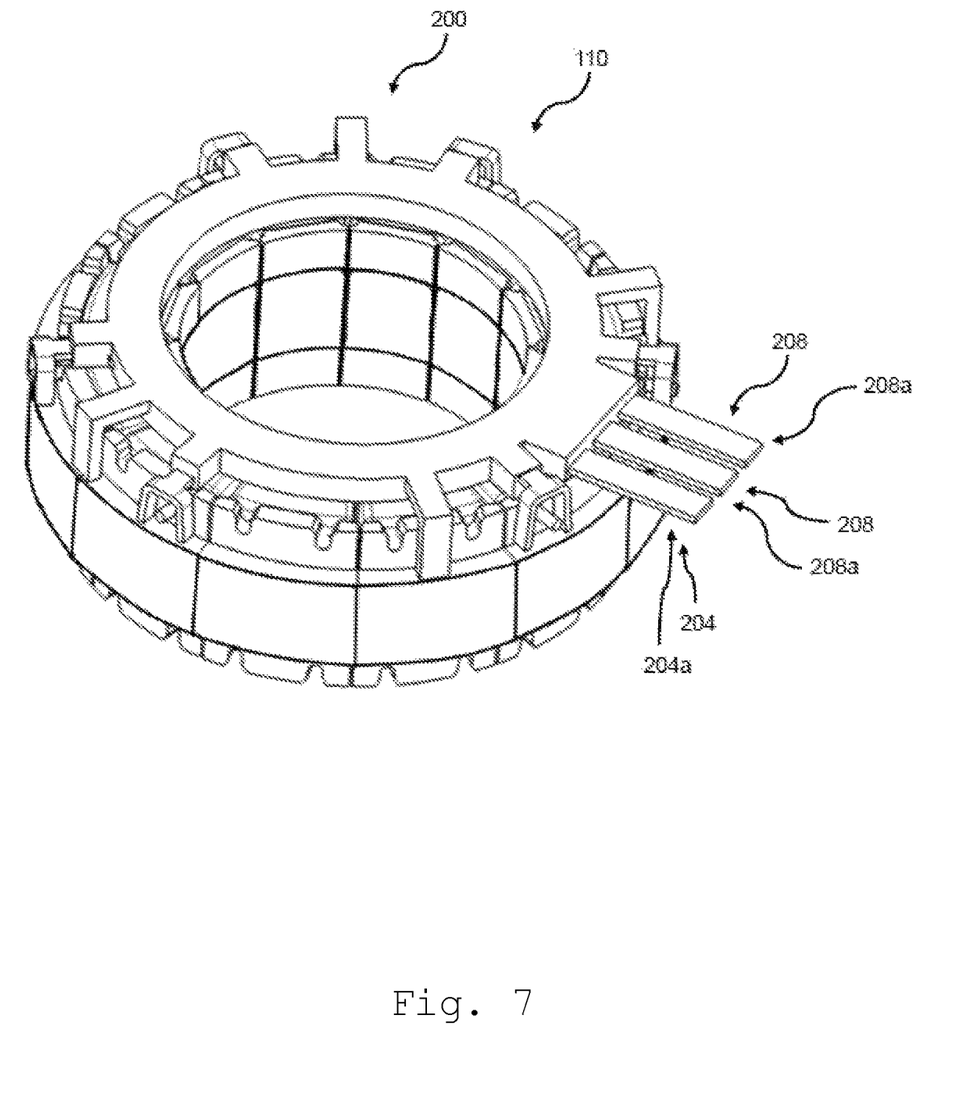
FIG. 7 shows a perspective view of the busbar unit of FIG. 5 mounted on an axial end side of the stator shown in FIG. 3.

In the following, a second example embodiment of the present disclosure will be described with reference to FIGS. 5 to 7. In FIGS. 5 to 7, elements corresponding to elements in FIGS. 1 to 4 are denoted by the same reference numerals, however, enhanced by the number 100. The second example embodiment will be described only inasmuch as it differs from the above-described first example embodiment.

FIG. 5 shows a perspective view of the busbar unit 200 according to the second example embodiment. In FIG. 6, only the busbars 204, 206, 208 of the busbar unit 200 are shown, i.e. the busbar holder 202 shown in FIG. 5 is omitted in FIG. 6. FIG. 7 shows the busbar unit 200 according to the second example embodiment mounted on an axial side of the stator shown in FIG. 3.

As shown in FIGS. 5 to 7, the busbar unit 200 according to the second example embodiment differs from the busbar unit 100 according to the first example embodiment only in view of the configuration of the power source connection terminal members 204a, 206a, 208a of the respective busbars 204, 206, 208. More specifically, different from the first example embodiment shown in FIGS. 1 to 4, the power source connection terminal members 204a, 206a, 208a are not configured as stepped members, but they respectively comprise a single straight portion extending in the radial direction of the busbar holder 202.

By means of this configuration, a force exerted onto the power source connection terminal members 204a, 206a, 208a in the radial direction of the busbar holder 202 does not cause a deflection of the power source connection terminal members 204a, 206a, 208a in the radial direction. This means that the force exerted onto the connection terminals of a power source or an electronic circuit such as a control unit interconnected between the busbar unit and the power source is increased as compared to the first example embodiment.

Consequently, according to the present disclosure, it is possible to accurately adjust the mechanical forces occurring during the connecting of the busbar unit to a power source or an electronic circuit by the design of the power source connection terminal members.

In the following, various example embodiments of the present disclosure will be described.

Example 1 is a busbar unit for a stator of an electric motor. The busbar unit may include: a busbar holder at least a part of which is made of an electrically insulating material and configured to be positioned on an axial side of a stator, the busbar holder having a stator surface that is intended to face an axial side of a stator when the busbar holder is positioned on the axial side of the stator as intended, and at least one busbar mounted on the busbar holder. The at least one busbar may include: a power source connection terminal member configured to be electrically connected to a power source, and at least one coil connection terminal member configured to be electrically connected to a coil of the stator and protruding beyond the stator surface of the busbar holder.

In Example 2, the subject matter of Example 1 can optionally further include that the at least one coil connection terminal member includes a crimp member configured to be crimped around an end portion of a coil wire.

In Example 3, the subject matter of Example 2 can optionally further include that the crimp member has a basically U-shaped or V-shaped form that is open at a leading end in the protrusion direction of the at least coil connection terminal member.

In Example 4, the subject matter of any one of Examples 1 to can optionally further include that the power source connection terminal member protrudes beyond the stator surface of the busbar holder.

In Example 5, the subject matter of any one of Examples 1 to 4 can optionally further include that the at least one busbar includes a base portion extending along the busbar holder and connecting the at least one coil connection terminal member to the power source connection terminal member.

In Example 6, the subject matter of any one of Examples 1 to can optionally further include that the busbar holder has a substantially annular shape or an annular segment shape.

In Example 7, the subject matter of any one of Examples 1 to 6 can optionally further include a plurality of busbars.

In Example 8, the subject matter of Examples 6 and 7 can optionally further include that the busbar holder includes a plurality of holder layers stacked in the axial direction of the busbar holder. At least one busbar may be mounted on each holder layer.

In Example 9, the subject matter of any one of Examples 6 to can optionally further include that the power source connection terminal member includes a stepped portion that includes a first portion extending basically in the radial direction of the busbar holder, a second portion connected to the first portion and extending in the axial direction of the busbar holder, and a third portion connected to the second portion and extending in the radial direction of the busbar holder. The second and third portions may be configured to be arranged outside of a stator in a radial direction of the stator.

In Example 10, the subject matter of any one of Examples 6 to can optionally further include that the power source connection terminal member comprises a single straight portion extending in the radial direction of the busbar holder.

In Example 11, the subject matter of any one of Examples 1 to can optionally further include at least one positioning member protruding beyond the stator surface of the busbar holder. The busbar holder may be configured to be positioned on an axial side of a stator by means of the at least positioning member.

In Example 12, the subject matter of Examples 6 and 11 can optionally further include that the at least one positioning member includes a first positioning member portion extending radially outwardly from the busbar holder, and a second positioning member portion extending from an end of the first positioning member portion in the axial direction of the busbar holder. An axial end of the second positioning member portion is intended to be positioned on an outer radial portion of an axial side of an annular stator.

In Example 13, the subject matters of Example 9 and of any one of Examples 11 or 12 can optionally further include that the second and third power source connection terminal portions are positioned radially outwardly of the at least one positioning member.

Example 14 is an electric motor including a busbar unit of any one of Examples 1 to 13.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A busbar unit for a stator of an electric motor, the busbar unit comprising:
   a busbar holder at least a portion of which is made of an electrically insulating material and is to be positioned on an axial side of the stator, wherein the busbar holder includes a stator surface that opposes an axial side surface of the stator when the busbar holder is positioned on the axial side of the stator, and a plurality of positioners structured to support the busbar holder on the axial side surface of the stator; and
   at least one busbar mounted on the busbar holder, the at least one busbar including:
      a power source connection terminal to be electrically connected to a power source; and
      at least one coil connection terminal to be electrically connected to a coil of the stator and protruding beyond the stator surface of the busbar holder;
   wherein
   the at least one coil connection terminal includes a crimp structured to be crimped around an end portion of a coil wire of the stator, the crimp is U-shaped or V-shaped and defines a channel which extends radially outward from a radial end of the busbar holder such that an end of the channel opens outward from the busbar holder; and
   the plurality of positioners protrude beyond the stator surface of the busbar holder and include first positioner portions extending radially outward and second positioner portions extending in an axial direction away from the first positioner portions to contact outer radial portions of the axial side surface of the stator.

2. The busbar unit of claim 1, wherein the crimp is provided at a leading end in a protrusion direction of the at least coil connection terminal.

3. The busbar unit of claim 1, wherein the power source connection terminal protrudes beyond the stator surface of the busbar holder.

4. The busbar unit of claim 1, wherein the at least one busbar includes a base portion extending along the busbar holder and connecting the at least one coil connection terminal to the power source connection terminal.

5. The busbar unit of claim 1, wherein the busbar holder has a substantially annular shape or an annular segment shape.

6. The busbar unit of claim 5, wherein the busbar holder includes a plurality of holder layers stacked in an axial direction of the busbar holder, wherein at least one busbar is mounted on each holder layer.

7. The busbar unit of claim 5, wherein the power source connection terminal includes a stepped portion that includes a first portion extending in a radial direction of the busbar holder, a second portion connected to the first portion and extending in an axial direction of the busbar holder, and a third portion connected to the second portion and extending in the radial direction of the busbar holder, wherein the second and third portions are outside of a stator in a radial direction of the stator.

8. The busbar unit of claim 7, wherein the second and third power source connection terminal portions are positioned radially outwardly of the plurality of positioners.

9. The busbar unit of claim 5, wherein the power source connection terminal includes a single straight portion extending in a radial direction of the busbar holder.

10. The busbar unit of claim 1, further comprising a plurality of busbars.

11. An electric motor comprising:
- a stator including a plurality of stator core segments around which coils are wound, the core segments including recesses at axial ends which receive winding wire end portions of the coils; and
- a busbar unit including:
  - a busbar holder at least a portion of which is made of an electrically insulating material and is to be positioned on an axial side of the stator, wherein the busbar holder includes a stator surface that opposes an axial side surface of the stator when the busbar holder is positioned on the axial side of the stator, and a plurality of positioners structured to support the busbar holder on the axial side surface of the stator; and
  - at least one busbar mounted on the busbar holder, the at least one busbar including:
    - a power source connection terminal to be electrically connected to a power source; and
    - at least one coil connection terminal to be electrically connected to at least one of the coils and protruding beyond the stator surface of the busbar holder; wherein the at least one coil connection terminal includes a crimp structured to be crimped around the winding wire end portions, the crimp is U-shaped or V-shaped and defines a channel which extends radially outward from a radial end of the busbar holder such that an end of the channel opens outward from the busbar holder; and the plurality of positioners protrude beyond the stator surface of the busbar holder and include first positioner portions extending radially outward and second positioner portions extending in an axial direction away from the first positioner portions to contact outer radial portions of the axial side surface of the stator.

* * * * *